(12) United States Patent
Chou

(10) Patent No.: US 10,911,943 B2
(45) Date of Patent: Feb. 2, 2021

(54) METHOD AND APPARATUS FOR SYSTEM INFORMATION DELIVERY

(71) Applicant: FG Innovation Company Limited, Tuen Mun (HK)

(72) Inventor: Chie-Ming Chou, Zhubei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/723,428

(22) Filed: Oct. 3, 2017

(65) Prior Publication Data
US 2018/0103369 A1 Apr. 12, 2018

Related U.S. Application Data

(60) Provisional application No. 62/405,394, filed on Oct. 7, 2016.

(51) Int. Cl.
*H04W 8/24* (2009.01)
*H04W 48/12* (2009.01)
(Continued)

(52) U.S. Cl.
CPC ........... *H04W 8/24* (2013.01); *H04L 27/2613* (2013.01); *H04W 48/08* (2013.01); *H04W 48/12* (2013.01);
(Continued)

(58) Field of Classification Search
CPC ....... H04W 8/24; H04W 48/08; H04W 48/12; H04W 72/0446; H04W 76/27; H04W 28/18; H04L 27/2613; H04L 5/0042
See application file for complete search history.

(56) References Cited

U.S. PATENT DOCUMENTS 9,155,007 B2 * 10/2015 Jung ................. H04W 36/0066
2003/0061557 A1 * 3/2003 Chao ..................... H04L 1/1835
714/748
(Continued)

FOREIGN PATENT DOCUMENTS

CN 101572934 A 11/2009
CN 103534970 A 1/2014
(Continued)

OTHER PUBLICATIONS

Intel Corporation System information for standalone NR deployment 3GPP TSG-RAN WG2 Meeting #95 R2-165007 Aug. 26, 2016(Aug. 26, 2016), Sections 2-3.
(Continued)

*Primary Examiner* — Jenee Holland
(74) *Attorney, Agent, or Firm* — ScienBiziP, P.C.

(57) ABSTRACT

A method for system information (SI) acquisition by a user equipment (UE) in a wireless communication network is disclosed. The SI comprises minimum SI and other SI. The method includes receiving the minimum SI from a base station, the minimum SI having an area identification (ID), requesting for the other SI from the base station when the area ID is different from a stored area ID on the UE, where the area ID is assigned to at least two cells in the wireless communication network. The method also includes requesting for at least one updated parameter of the other SI from the base station when a value tag in the minimum SI is different from a stored value tag on the UE.

23 Claims, 5 Drawing Sheets

(51) Int. Cl.
  *H04L 27/26* (2006.01)
  *H04W 48/08* (2009.01)
  *H04W 72/04* (2009.01)
  *H04L 5/00* (2006.01)
  *H04W 76/27* (2018.01)
  *H04W 28/18* (2009.01)

(52) U.S. Cl.
  CPC ....... *H04W 72/0446* (2013.01); *H04L 5/0042* (2013.01); *H04W 28/18* (2013.01); *H04W 76/27* (2018.02)

(56) References Cited

U.S. PATENT DOCUMENTS

| | | | | |
|---|---|---|---|---|
| 2003/0069008 A1* | 4/2003 | Nakazawa | ............ | H04W 8/245 455/419 |
| 2006/0007877 A1* | 1/2006 | Vaittinen | ............... | H04W 76/34 370/328 |
| 2008/0125043 A1* | 5/2008 | Karmanenko | ........ | H04W 12/10 455/41.2 |
| 2008/0160981 A1* | 7/2008 | Farnsworth | ........... | H04W 48/16 455/418 |
| 2008/0207170 A1* | 8/2008 | Khetawat | ............ | H04W 60/005 455/411 |
| 2009/0170426 A1* | 7/2009 | Jung | ........................ | H04W 8/24 455/7 |
| 2009/0170441 A1* | 7/2009 | Eckert | ................... | H04W 24/10 455/67.11 |
| 2009/0225739 A1* | 9/2009 | Yeo | ..................... | H04W 74/004 370/345 |
| 2009/0316603 A1* | 12/2009 | Amerga | ................ | H04W 48/08 370/254 |
| 2010/0048168 A1* | 2/2010 | Fox | ....................... | H04W 48/12 455/410 |
| 2010/0093350 A1* | 4/2010 | Wang | .................... | H04W 8/183 455/436 |
| 2010/0128805 A1* | 5/2010 | Tanno | .................. | H04B 1/7083 375/260 |
| 2010/0142456 A1* | 6/2010 | Lee | ........................ | H04W 72/02 370/329 |
| 2010/0297999 A1* | 11/2010 | Iwamura | ............... | H04W 60/04 455/440 |
| 2011/0039552 A1* | 2/2011 | Narasimha | ............ | H04W 76/19 455/425 |
| 2011/0183661 A1* | 7/2011 | Yi | ........................ | H04W 24/10 455/422.1 |
| 2012/0088495 A1* | 4/2012 | Tsai | ...................... | H04W 76/18 455/422.1 |
| 2012/0250501 A1* | 10/2012 | Lee | ........................ | H04W 4/90 370/229 |
| 2012/0300655 A1* | 11/2012 | Lee | ........................ | H04W 24/00 370/252 |
| 2013/0121225 A1* | 5/2013 | Ryu | .................. | H04W 52/0229 370/311 |
| 2013/0201897 A1* | 8/2013 | Morioka | ................ | H04B 7/155 370/312 |
| 2013/0315194 A1* | 11/2013 | Ahn | ..................... | H04L 5/0066 370/329 |
| 2014/0023016 A1* | 1/2014 | Mildh | .................... | H04L 5/001 370/329 |
| 2014/0029594 A1* | 1/2014 | Lee | ................... | H04W 72/0446 370/336 |
| 2014/0321435 A1* | 10/2014 | Pradas | .............. | H04W 28/0278 370/336 |
| 2014/0349694 A1* | 11/2014 | Raghothaman | ....... | H04W 36/00 455/509 |
| 2015/0223258 A1* | 8/2015 | Jung | ................... | H04W 72/082 455/452.1 |
| 2015/0230179 A1* | 8/2015 | Gupta | ................. | H04L 61/3075 370/311 |
| 2015/0304023 A1* | 10/2015 | Cho | ......................... | H04B 7/26 370/329 |
| 2015/0304946 A1* | 10/2015 | Shah | ..................... | H04W 48/16 455/434 |
| 2016/0057702 A1* | 2/2016 | Morioka | ........... | H04W 52/0216 370/329 |
| 2016/0081117 A1* | 3/2016 | Morioka | ............. | H04W 74/006 370/336 |
| 2016/0128006 A1* | 5/2016 | Ji | .......................... | H04W 48/14 370/350 |
| 2016/0234759 A1 | 8/2016 | Kubota et al. | | |
| 2016/0242220 A1 | 8/2016 | Jung et al. | | |
| 2016/0262159 A1* | 9/2016 | Puddle | ................ | H04W 68/005 |
| 2017/0251500 A1* | 8/2017 | Agiwal | ................... | H04W 4/06 |
| 2017/0311290 A1* | 10/2017 | Adjakple | ............. | H04W 16/02 |
| 2017/0331577 A1* | 11/2017 | Parkvall | .............. | H04J 11/0079 |
| 2017/0331670 A1* | 11/2017 | Parkvall | ............ | H04W 52/0274 |
| 2017/0366236 A1* | 12/2017 | Ryoo | ................... | H04B 7/0421 |
| 2018/0013524 A1* | 1/2018 | Chien | ..................... | H04L 5/005 |
| 2018/0049022 A1* | 2/2018 | Johansson | ............... | H04W 8/24 |
| 2018/0063815 A1* | 3/2018 | Ishii | ..................... | H04W 64/00 |
| 2018/0091485 A1* | 3/2018 | Lee | ........................ | H04W 76/27 |
| 2019/0150071 A1* | 5/2019 | Lee | ........................ | H04W 4/70 370/328 |
| 2019/0174554 A1* | 6/2019 | Deenoo | ................. | H04W 80/02 |

FOREIGN PATENT DOCUMENTS

| | | |
|---|---|---|
| CN | 105474721 A | 4/2016 |
| CN | 105745848 A | 7/2016 |
| EP | 3504812 A1 | 7/2019 |
| KR | 10-2009-0104471 A | 10/2009 |
| KR | 10-2016-0012234 A | 2/2016 |
| WO | 2013116015 A | 8/2013 |

OTHER PUBLICATIONS

Samsung Report of email discussion on [94#40][NR] System information 3GPP TSG-RAN WG295 R2-165201 Aug. 26, 2016(Aug. 26, 2016).

Sharp, NR System Information Areas for Other SI, 3GPP TSG-RAN WG2#95bis R2-166353, 3GPP, Sep. 30, 2016.

Samsung, System Information Signalling Design in NR, 3GPP TSG-RAN WG2 #95 R2-164693, 3GPP, Aug. 12, 2016.

Gemalto N.V., System Information for NR including ID and version tag, 3GPP TSG-RAN WG2 #95bis R2-166132, 3GPP, Sep. 28, 2016.

Intel Corporation, System information for standalone NR deployment, 3GPP TSG-RAN WG2 #95bis R2-166885, 3GPP, Oct. 1, 2016.

3GPP TSG-RAN WG2 95 R2-165201, Report of email discussion on [NR] System information, p. 22, Samsung, Aug. 26, 2016.

\* cited by examiner

METHOD AND APPARATUS FOR SYSTEM INFORMATION DELIVERY

CROSS-REFERENCE TO RELATED APPLICATION(S)

The present application is related to provisional U.S. Patent Application Ser. No. 62/405,394 filed Oct. 7, 2016, entitled "Method and Apparatus for System Information Delivery," Ser. No. 62/405,394 (hereinafter referred to as "application Ser. No. 62/405,394"). The disclosure of the application Ser. No. 62/405,394 is hereby incorporated fully by reference into the present application.

FIELD

The present application generally relates to wireless communications, and pertains particularly to system information delivery.

BACKGROUND

In a wireless network, such as an evolved-universal terrestrial radio access network (E-UTRAN), a user equipment (UE) needs to perform a system information (SI) acquisition procedure to acquire various parameters of Access Stratum (AS) and Non Access Stratum (NAS). These parameters are common for all the UEs in the same cell and are traditionally broadcast in all the wireless technologies. The UE may acquire SI for various purposes, such as system access (e.g., after handover, after entering E-UTRA from another RAT) and idle mode procedures (e.g., cell selection and re-election, and etc.).

Traditionally, system information can be grouped into a Master Information Block (MIB) and a number of System Information Blocks (SIBs). For example, in a long term evolution (LTE) network, system information may include a MIB and multiple SIBs (e.g., SIB1 through SIB20). The MIB defines the most essential physical layer information of the cell that is required to received other system information parts. The MIB provides the system frame number (SFN), downlink (DL) system bandwidth, and physical HARQ indicator channel (PHICH) configuration. It may be transmitted every 40 ms and the scheduling information is standardized. The SIBs are characterized by the type of information each SIB carries. For example, SIB1 contains information for evaluating whether a UE is allowed to access or camp on a cell and further defines the scheduling of other SIGs. SIB1 also contains cell access-related information (e.g., PLMN identity list, public land mobile network (PLMN) identity, cell identity, cell status, and etc.), cell selection information (minimum receiver level), and scheduling information (SI message type and periodicity, SI window length, and etc.). SIB2 provides information about common and shared channels which includes random access channel (RACH), physical RACH (PRACH), broadcast control channel (BCCH), physical downlink shared channel (PDSCH), physical uplink shared channel (PUSCH) and etc. SIBs 3 to 8 provide information required for cell reselection. SIB3 provides information on intra-frequency cell reselection except neighbor cell information. SIB4 provides information on neighbor cell information. SIB5 is for inter-frequency cell reselection. SIB6, SIB7, and SIB8 are respectively for UTRAN, GERAN, and CDMA related cell (re)selection.

A UE may read system information during an initial attach process. Once the UE is camped to a new cell, it reads the relevant SI. If some SI values have changed, the network may page the UEs to inform the UEs about the changes. The UEs may read the SI during the next modification cycle. The modification cycle is a cell specific parameter that is signaled in the SIB2. Once the UE receives a paging indicating a SIB modification, it may invalidate all the SI and retrieve all the SI again.

New Radio (NR) has been discussed in the 3rd Generation Partnership Project (3GPP) as a key technology for supporting the operation of the next generation wireless network. In NR systems and networks, fast and efficient SI distribution is desirable. However, specific SI distribution mechanisms have not been extensively studied.

As mentioned above, conventionally, cells broadcast SI in all the wireless technologies, without taking into consideration of the conditions and/or characteristics of the UEs in their coverage areas. Such SI delivery method undesirably consumes radio resource and increases operation overhead.

Thus, there is a need in the art for an effective SI delivery method to provide SI to UEs, where the SI delivery method takes into consideration of the conditions and/or characteristics of the UEs.

BRIEF DESCRIPTION OF THE DRAWINGS

Aspects of the exemplary disclosure are best understood from the following detailed description when read with the accompanying Figures. Various features are not drawn to scale, dimensions of various features may be arbitrarily increased or reduced for clarity of discussion.

DETAILED DESCRIPTION

Figure 1:
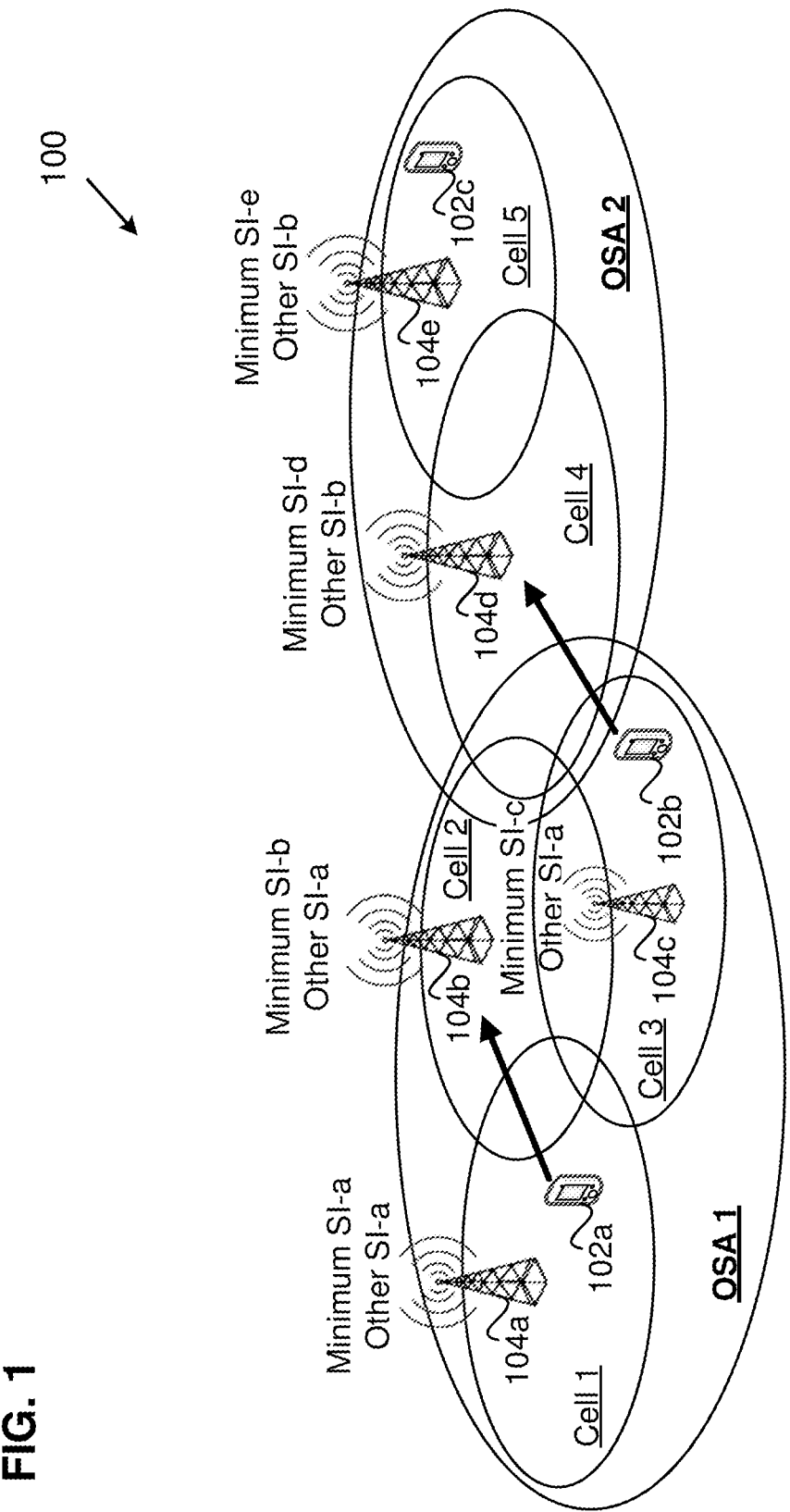
FIG. 1 illustrates a schematic diagram of a wireless communication system, in accordance with an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) and (2) Polar Code. The coding scheme adaption may be configured based on the channel conditions and/or the service applications.

Moreover, it is also considered that in a transmission time interval Tx of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Referring to FIG. 1, FIG. 1 illustrates a schematic diagram of a wireless communication system, in accordance with an exemplary implementation of the present application. In FIG. 1, wireless network 100 includes UE 102a, UE 102b, UE 102c, base station 104a, base station 104b, base station 104c, base station 104d, and base station 104e. In the present exemplary implementation, base stations 104a, 104b, 104c, 104d, and 104e are located in cells 1, 2, 3, 4, and 5, respectively. In wireless network 100, cells 1, 2, and 3 are within other SI area (OSA) 1, while cells 4 and 5 are within OSA 2.

In OSA 1, cell 1, cell 2, and cell 3 provide minimum SI-a, minimum SI-b, and minimum SI-c, respectively, where the contents of minimum SI-a, minimum SI-b, and minimum SI-c are different from one another. In OSA 1, cell 1, cell 2, and cell 3 share the same other SI content (e.g., other SI-a). For example, cells 1, 2, and 3 may provide through base stations 104a, 104b, and 104c, respectively, other SI-a to UEs in their respective cells. In one implementation, other SI-a includes one or more other SI blocks. In one implementation, cells 1, 2, and 3 may provide entirely or at least partially the same other SI blocks to UEs in their coverage areas. In another implementation, cells 1, 2, and 3 may provide at least one common other SI block to UEs in their coverage areas.

It should be noted that, in one implementation, a cell may belong to more than one OSA, since the OSAs may overlap with one another. As such, a cell may provide different other SI blocks based on different OSAs. For example, a UE may request for one or more other SI blocks for a specific OSA based on an OSA determination by the UE. The base station may transmit the requested other SI blocks of the specific OSA to the UE, based on the UE's OSA determination. In one implementation, any of cells 1, 2, and 3 may belong to more than one OSA (e.g., OSA 1 and OSA 3 (not explicitly shown)), and may provide, in addition to other SI-a, other SI-c having different other SI content than other SI-a in another OSA (e.g., OSA 3). That is, any of cells 1, 2, and 3 may provide different other SI contents with respect to the different OSAs they belong to.

In OSA 2, cell 4 and cell 5 provide minimum SI-d and minimum SI-e, respectively, where the contents of minimum SI-d and minimum SI-e are different from each other. In OSA 2, cell 4 and cell 5 share the same other SI content (e.g., other SI-b). For example, cells 4 and 5 may provide through base stations 104d and 104e, respectively, other SI-b to UEs in their respective cells. In the present implementation, other SI-b of cells 4 and 5 is different from other SI-a of cells 1 through 3, since cells 4 and 5 belong to OSA 2, which is different from OSA 1.

In the present exemplary implementation, UE 102a moves from the coverage area of cell 1 to the coverage area of cell 2. Since cells 1 through 5 each provide their own minimum SI, as UE 102a moves from cell 1 to cell 2, UE 102a is required to acquire minimum SI-b of cell 2, for example, in order to camp on cell 2. For example, base station 104b may broadcast minimum SI-b of cell 2 periodically to UEs within the coverage area of cell 2. After receiving minimum SI-b of cell 2, UE 102a may determine whether it is required to further acquire other SI from cell 2. For example, after moving from cell 1 to cell 2, UE 102a may determine whether it is still within OSA 1, in which all of the cells (e.g., cells 1, 2, and 3) share the same other SI content (e.g., other SI-a having one or more other SI-a blocks). If UE 102a determines that it is still within OSA 1 as it moves from cell 1 to cell 2, then UE 102a is not required to acquire the other SI from cell 2 since the other SI-a stored therein is still valid.

In the present implementation, because cell 1 and cell 2 both belong to OSA 1, they share the same other SI content (e.g., other SI-a). Thus, UE 102a is not required to acquire the other SI from cell 2. That is, UE 102a can apply other SI-a obtained from cell 1 after it moves from cell 1 to cell 2. In one implementation, UE 102a may compare an OSA ID of cell 2 with an OSA ID of cell 1, where the OSA ID of cell 1 is stored in UE 102a, to determine whether it is within the same OSA. In one implementation, the OSA ID of cell 2 may be appended in minimum SI-b, which is provided to UE 102a by cell 2.

In another implementation, cell 1 and cell 2 may belong to both OSA 1 and OSA 3 (not explicitly shown in FIG. 1). UE 102a may have other SI-c stored therein from cell 1, instead of other SI-a of OSA 1. After camping on cell 2 as it moved from cell 1 to cell 2, UE 102a may determine whether cell 2 is still within OSA 3. If UE 102a determines that it is still within OSA 3 as it moves from cell 1 to cell 2, then UE 102a is not required to acquire the other SI from cell 2 since the other SI-c stored therein is still valid.

In another implementation, instead of having UE 102a determine whether it needs to acquire the content of other SI from cell 2, cell 2 may compare an OSA ID from UE 102a with its OSA ID and determine whether UE 102a needs to acquire the other SI (e.g., other SI-a) from cell 2. UE 102a may report its stored OSA ID to cell 2. Cell 2 may compare the OSA ID from UE 102a with the OSA ID of cell 2. Cell 2 may provide its other SI content (e.g., other SI-a) to UE 102a, when cell 2 determines that the OSA ID provided by UE 102a is different from the OSA ID of cell 2. Otherwise, cell 2 does not need to provide its other SI content (e.g., other SI-a) to UE 102a because the other SI (e.g., other SI-a) stored in UE 102a is still valid.

In the present exemplary implementation, UE 102b moves from the coverage area of cell 3 to the coverage area of cell 4. Since cells 1 through 5 each provide their own minimum SI, as UE 102b moves from cell 3 to cell 4, UE 102b is required to acquire minimum SI-d of cell 4, for example, in order to camp on cell 4. For example, base station 104d may broadcast minimum SI-d of cell 4 periodically to UEs within the coverage area of cell 4. After receiving minimum SI-d of cell 4, UE 102b may determine whether it is required to further acquire other SI (e.g., other SI-b) from cell 4. For example, after moving from cell 3 to cell 4, UE 102b may determine whether it is still within OSA 1, in which all of the cells (e.g., cells 1, 2, and 3) share the same other SI content (e.g., other SI-a). If UE 102b determines that it is still within OSA 1 as it moves from cell 3 to cell 4, then UE 102b is not required to acquire the other SI from cell 4. Otherwise, UE 102b needs to acquire the other SI from cell 4 since the other SI stored therein is no longer valid.

In the present implementation, cell 3 belongs to OSA 1 while cell 4 belongs to OSA 2. Other SI-a of cell 3 and other SI-b of cell 4 have different contents since cell 3 and cell 4 belong to different OSAs. Thus, UE 102b is required to acquire the other SI (e.g., other SI-b) from cell 4, since other SI-a of cell 3 is no longer valid as UE 102a moves from cell 3 in OSA 1 to cell 4 in OSA2. LB 102b may need to discard stored other SI-a therein, and acquire new other SI content (e.g., other SI-b) of cell 4. In one implementation, UE 102b may compare an OSA ID of cell 4 with an OSA ID of cell 3, where the OSA ID of cell 3 is stored in UE 102b, to determine whether it is still within the same OSA. In one implementation, the OSA ID of cell 4 may be appended in minimum SI-d, which is provided to UE 102b by cell 4.

In the present implementation, since the OSA ID of cell 3 is different from the OSA ID of cell 4, as cells 3 and 4 reside in different OSAs, UE 102*b* determines that it is no longer in a cell in which the other SI corresponding to the stored OSA ID is valid. As such, UE 102*b* may send a request to cell 4 to acquire other SI (e.g., other SI-b) from cell 4. For example, when UE 102*b* identifies that the OSA ID from cell 4 is different from its stored OSA ID, UE 102*b* may send a specific preamble or a radio resource control (RRC) message to cell 4 to request for other SI-b.

In another implementation, instead of having LIE 102*b* determine whether it needs to acquire the content of other SI from cell 4, cell 4 may compare an OSA ID from UE 102*b* with its OSA ID and determine whether UE 102*b* needs to acquire other SI-b from cell 4. UE 102*b* may provide its stored OSA ID to cell 4. Cell 4 may identify whether the OSA ID from UE 102*b* is the same as the OSA ID of cell 4. Cell 4 may provide its other SI content (e.g., other SI-b) to UE 102*b*, when cell 4 determines that the OSA ID provided by UE 102*b* is different from the OSA ID of cell 4. Otherwise, cell 4 does not need to provide its other SI content (e.g., other SI-b) to UE 102*b* because the other SI stored in UE 102*b* is still valid.

In the present exemplary implementation, UE 102*c* moves within the coverage area of cell 5. While within cell 5, UE 102*c* may receive updates of minimum SI-e and/or other SI-b. Since cell 5 provides its minimum SI (e.g., minimum SI-e) to UEs in its coverage area, UE 102*c* may receive minimum SI-e and/or any updates of minimum SI-e periodically from cell 5, for example, through base station 104*e*. After receiving minimum SI-e of cell 5, UE 102*c* may monitor a Value Tag of other SI (Value Tag) in an OSA ID appended in minimum SI-e to determine whether it needs to acquire an updated version of other SI-b from cell 5. If the Value Tag from cell 5 is different from a Value Tag that is stored in UE 102*c*, UE 102*c* needs to acquire updated other SI from cell 5, despite the fact that UE 102*c* is still within the coverage area of cell 5 and OSA 2. In one implementation, UE 102*c* may request for the entire other SI-b from cell 5. In another implementation, UE 102*c* may request for only the updated other SI parameters (e.g., delta information) from cell 5 to conserve network resources and reduce latency. In another implementation, UE 102*c* may request for the other SI-b from cell 5 without indicating any of its own information, cell 5 may determine to transmit the entire other SI-b to UE 102*c*.

In another implementation, instead of having UE 102*c* determine whether it needs to acquire updated content of other SI from cell 5, cell 5 may compare a Value Tag from UE 102*c* with its current Value Tag and determine whether UE 102*c* needs to acquire the updated content of other SI-b. UE 102*c* may report its stored OSA ID having the stored Value Tag to cell 5. Cell 5 may compare the stored Value Tag from UE 102*c* with the current Value Tag of cell 5. Cell 5 may provide the updated other SI content to UE 102*c*, when cell 5 determines that the stored Value Tag from UE 102*c* is different from cell 5's current Value Tag.

In one implementation, other SI-b includes one or more other SI blocks. In one implementation, cells 4 and 5 may provide entirely or at least partially the same other SI blocks to UEs in their coverage areas. In another implementation, cells 4 and 5 may provide at least one common other SI block to UEs in their coverage areas.

According to implementations of the present application, the minimum system information may include, but is not limited, at least one of the following fields:

(1) Information for facilitating initial access (e.g., access admission control information, random access configuration, beam parameters, frame timing information);
(2) Information for facilitating the validity of other SI;
(3) Cell identity which include PLMN ID, tracking area ID, cell ID.

According to implementations of the present application, the other system information, the information that is not included in the minimum system, may be transmitted. The other system information may include, but is not limited, at least one of the following fields:

(1) Information for cell reselection (further comprise intra-frequency, inter-frequency, inter-RAT information);
(2) Information regarding with Multimedia Broadcast/Multicast Service (MBMS) services;
(3) Information regarding with GPS time and Coordinated Universal Time (UTC);
(4) Information regarding with traffic steering between NR and Wi-Fi;
(5) Information regarding with Device to Device (D2D) services;
(6) Information regarding with V2X services.

It is noted that the details of the OSA ID will be explained below. Also, the mechanisms for UE 102*a*/102*b*/102*c* to determine whether it is required to acquire other SI will be explained in detail below.

Figure 2A:
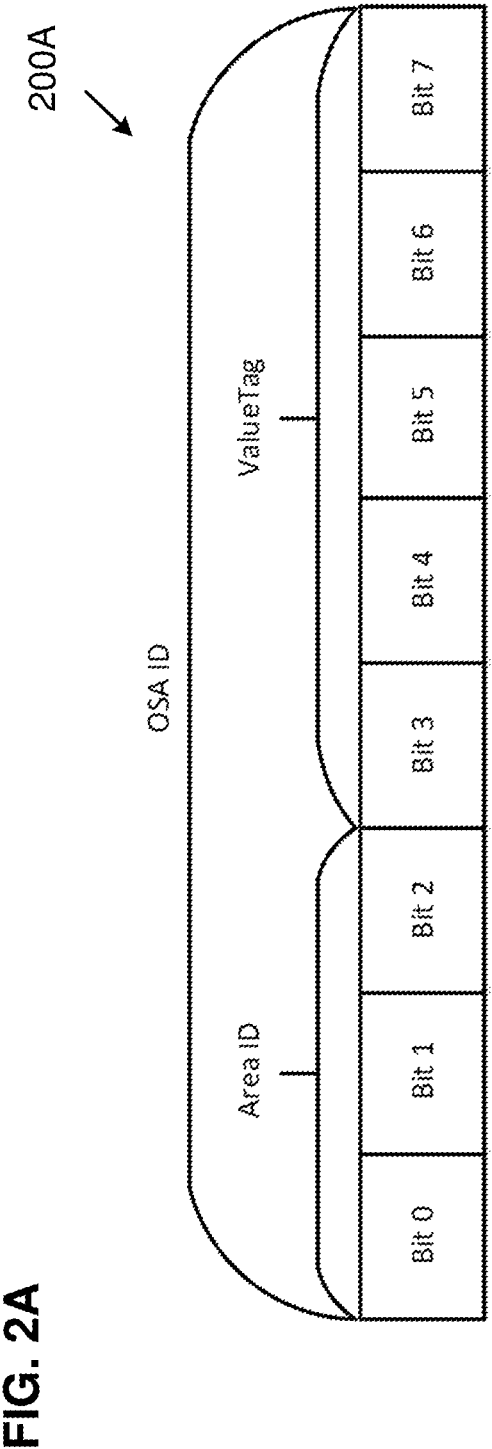
FIG. 2A illustrates an OSA ID format, in accordance with an exemplary implementation of the present application.

FIG. 2A illustrates an OSA ID format, in accordance with an exemplary implementation of the present application. In FIG. 2A, OSA ID 200A is a bitmap having eight bits (e.g., bits 0, 1, 2, 3, 4, 5, 6, and 7). The first three bits (e.g., bits 0, 1, and 2) of OSA ID 200A represent an area code or Area ID (e.g., 0-8), where the Area ID informs one or more UEs which OSA they are in. The Area ID helps the UEs to determine whether they are required to obtain or acquire other SI. It is noted that an Area ID may be reused to identify more than one OSA, provided that the OSAs are far apart from one another such that reusing the same Area ID would not cause confusion to an UE as the UE moves from one cell to another. For example, an Area ID may not be reused by a cell's immediately adjacent neighboring cells and their immediately adjacent neighboring cells.

The remaining bits (e.g., its 3, 4, 5, 6, and 7) of OSA ID 200A represent a Value Tag of other SI (Value Tag), where the Value Tag informs the UEs the specific version of the other SI provided by the cell. The Value Tag may be similar to systeminfo valuetag defined in 3GPP TS36.331, which is incorporated herein with by reference in its entirety. The Value Tag helps the UEs to determine whether they are required to update the other SI parameters or values, even though the UEs may be still within the same OSA having the same Area ID. In one implementation, OSA ID 200A having the Area ID and Value Tag may be referred to as an information field. It is noted that a cell may transmit multiple other SIs within its coverage area, where different other SIs may correspond to different OSA IDs. For example, cell 1, in FIG. 1, may provide other SI-a corresponding to OSA 1, and other SI-c corresponding to OSA 3.

In one implementation, a cell may append OSA ID 200A (i.e., information field) in the minimum SI, which may be broadcast periodically by the cell to the UEs in its coverage area. When a UE (e.g., UE 102*a*/102*b*/102*c* in FIG. 1) receives the OSA ID, the Area ID and Value Tag will become known to the UE. Thereafter, the UE may take different actions in response to different situations, as being enumerated in Table 1.

TABLE 1

Operations after receiving OSA ID

| Situation | Operation |
| --- | --- |
| (1) Same Area ID and Value Tag | (1) No need for other SI acquisition |
| (2) Same Area ID, different Value Tag | (2) Need to request for new version of other SI |
| (3) Different Area ID, same Value Tag | (3) Need other SI acquisition |
| (4) Different Area ID, different Value Tag | (4) Need other SI acquisition |

As shown in Table 1, under situation 1, a UE receives an OSA ID having the same Area ID and same Value Tag as those stored in the UE. Since the Area ID is the same as an Area ID stored in the UE, the UE determines that it is still within the same OSA. Since the Value Tag is the same as a Value Tag stored in the UE, the UE determines that the stored version of other SI is still valid. Thus, there is no need for other SI acquisition.

Under situation 2, a UE receives an OSA ID having the same Area ID but a different Value Tag from a Value Tag stored in the UE. Since the Area ID is the same as an Area ID stored in the UE, the UE determines that it is still within the same OSA. However, Since the Value Tag is different from a Value Tag stored in the UE, the UE determines that at least a portion of the stored version of other SI is no longer valid. Thus, the UE needs to request for the new/updated version of the other SI from the cell. In one implementation, when the UE identifies that the Value Tag in the OSA ID from the cell is different from its stored Value Tag, while the Area ID is the same, the UE sends its stored Value Tag to the cell. Upon receiving the Value Tag from the UE, the cell may only provide the updated parameters and values (e.g., delta information) of the other SI to the UE, instead of sending the entire new/updated version of the other SI to the UE, to save network resources and reduce latency. In another implementation, the cell may provide the entire new/updated version of the other SI to the UE.

Under situation 3, a UE receives an OSA ID having a different Area ID, but the same Value Tag as what's stored in the UE. Since the Area ID in the OSA ID from the cell is different from an Area ID stored in the UE, the UE determines that it is no longer within the OSA having the stored Area ID. In this situation, regardless of whether the Value Tag is the same as the UE's stored Value Tag, the stored other SI is no longer valid since the UE has moved to a new OSA. Thus, the UE needs to request for the entirely new other SI from the cell in the new OSA. In one implementation, the UE may send a request for other SI without appending any value tag information, and then the cell may provide the entire other SI by default.

Under situation 4, a UE receives an OSA ID having a different Area ID and a different Value Tag from what's stored in the UE. Since the Area ID in the OSA ID from the cell is different from an Area ID stored in the UE, the UE determines that it is no longer within the OSA having the stored Area ID. Similar to situation 3, regardless of whether the Value Tag is the same as the stored Value Tag, the stored other SI is no longer valid since the UE has moved to a new OSA. Thus, the UE needs to request for the entirely new other SI from the cell in the new OSA. In one implementation, the UE may send a request for other SI without appending any value tag information, and then the cell may provide the entire other SI by default.

In one implementation, the UE may send a request, in the form of a specific preamble, to the cell to acquire the other SI. In another implementation, the UE may send a request, in the form of an RRC message, to acquire the other SI. It is noted that each other SI may have a specific preamble dedicated thereto, and multiple specific preambles may be assigned to the UE. The UE may send one of the assigned specific preambles when the UE needs to request the corresponding other SI. For using an RRC message as the request message, the UE may further indicate which other SI is required and optionally append the stored value tag for the other SI.

It is noted that, in some implementations, minimum SI may have its own value tag, which may be also appended in the minimum SI.

Figure 2B:
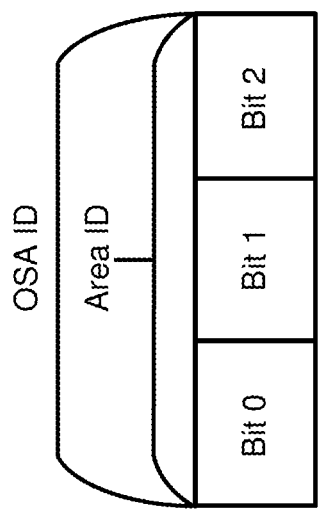
FIG. 2B illustrates an OSA ID format, in accordance with another exemplary implementation of the present application.

FIG. 2B illustrates an OSA ID format, in accordance with another exemplary implementation of the present application. In FIG. 2B, OSA ID 200B is a bitmap having three bits (e.g., bits 0, 1, and 2). Bits 0, 1, and 2 represent an area code or Area ID (e.g., 0-8), where the Area ID informs one or more UEs which OSA they are in. In one implementation, OSA ID 200B having the Area ID may be referred to as an information field. In one implementation, a cell may append OSA ID 200B (i.e., information field) in minimum SI, which may be broadcast periodically by the cell to the UEs in its coverage area. When a UE (e.g., UE 102a/102b/102c in FIG. 1) receives the OSA ID, the Area ID of the cell will become known to the UE. The Area ID informs one or more UEs which OSA they are in, so that the UEs can determine whether they are required to obtain or acquire other SI from the cell. In contrast to OSA ID 200A in FIG. 2A, OSA ID 200B does not include a Value Tag of other SI in the OSA ID. Instead, the Value Tag may be sent to the UE upon request or demand from the UE. For example, a cell may provide the other SI by appending the corresponding Value Tag to the UE after receiving the request from the LIE.

In one implementation, a Value Tag of other SI may be provided by the cell, for example, through an RRC message. For example, a UE (e.g., an RRC active UE) moves from cell 1 to cell 2. Cell 2 may check the UE's Value Tag to see if the UE needs to acquire cell 2's other SI. Regardless of whether cell 1 and cell 2 are in the same OSA, cell 2 (e.g., a serving cell) may negotiate with cell 1 (e.g., the source cell) about the Value Tag information for the UE when the LIE moves to cell 2's coverage and establishes an RRC connection with cell 2. In another implementation, a UE may indicate a stored Value Tag to the cell.

In one implementation, a UE (e.g., an RRC active, inactive or idle UE) moves from cell 1 to cell 2. When the UE identifies that the Area ID of cell 2 is different from its stored Area ID, the UE may transmit a specific preamble to request for other SI. After receiving the specific preamble, the cell may provide other SI to the UE in a dedicated resource. When the UE identifies that the Area ID is the same as its stored Area ID, it may snoop the other SI's Value Tag upon one or more dedicated resources. If the Value Tag becomes different from its stored Value Tag, then the UE may transmit a specific preamble to request for the other SI.

Figure 3:
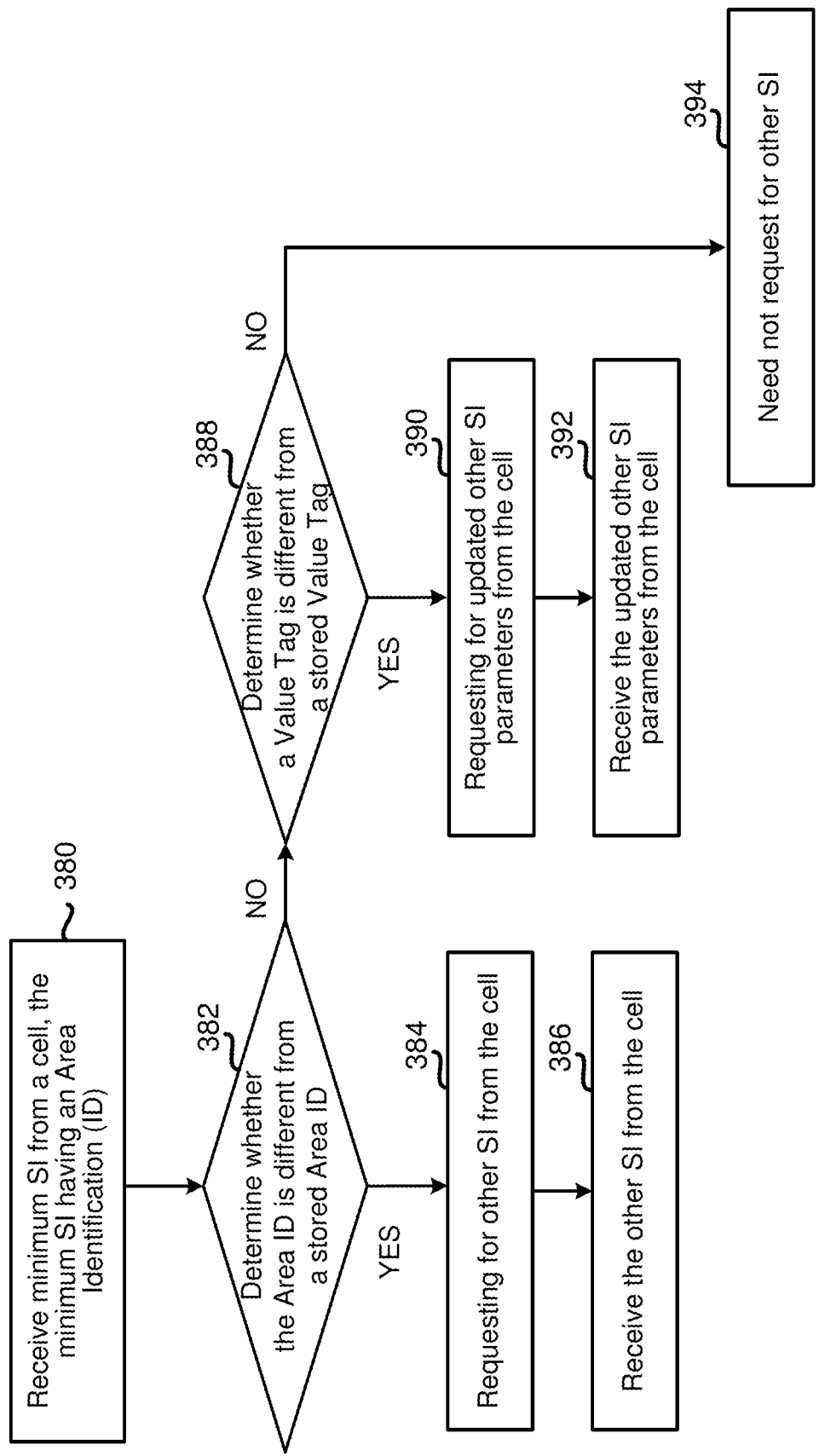
FIG. 3 is a flowchart diagram illustrating a method performed by a UE for other SI acquisition, in accordance with an exemplary implementation of the present application.

FIG. 3 is a flowchart diagram illustrating a method performed by a UE for other SI acquisition, in accordance with an exemplary implementation of the present application. In FIG. 3, flowchart 300 includes actions 380, 382, 384, 386, 388, 390, 392, and 394. Flowchart 300 may apply to any of UEs 102a, 102b, and 102c described with reference to FIG. 1.

In action 380, a UE receives minimum SI from a cell, where the minimum SI includes an OSA ID (e.g., OSA ID 200A/200B in FIG. 2A/2B). The OSA ID (i.e., the information field) includes at least an Area ID. In action 382, the UE determines whether the Area ID is different from an Area ID stored in the UE (e.g., stored Area ID).

If the UE determines that the Area ID appended in the minimum SI from the cell is different from the stored Area ID, then flowchart 300 proceeds to action 384, where the UE requests for other SI from the cell. Upon request from the UE, the cell transmits the other SI to the UE. That is, the UE receives the other SI from the cell in action 386.

On the other hand, if the UE determines that the Area ID appended in the minimum SI from the cell is the same as the stored Area ID in action 382, then flowchart 300 proceeds to action 388, where the UE determines whether a Value Tag of other SI (Value Tag), for example, in the OSA ID appended in the minimum SI, is different from a Value Tag stored on the UE (e.g., stored Value Tag).

If the UE determines that the Value Tag from the cell is different from the stored Value Tag, then flowchart 300 proceeds to action 390, where the UE requests for updated parameters of the other SI from the cell. Upon request from the UE, the cell transmits the updated parameters of the other SI to the UE. That is, the UE receives the updated parameters of the other SI from the cell in action 392.

On the other hand, if the UE determines that the Value Tag from the cell is the same as the stored Value Tag in action 388, then flowchart 300 proceeds to action 394, where the UE determines that it needs not request for other SI from the cell, since the other SI stored in the UE is still valid.

Various mechanisms for other SI acquisition signaling are described below. The mechanisms for other SI acquisition signaling may be categorized into UE-oriented signaling and cell-oriented signaling.

Figure 4:
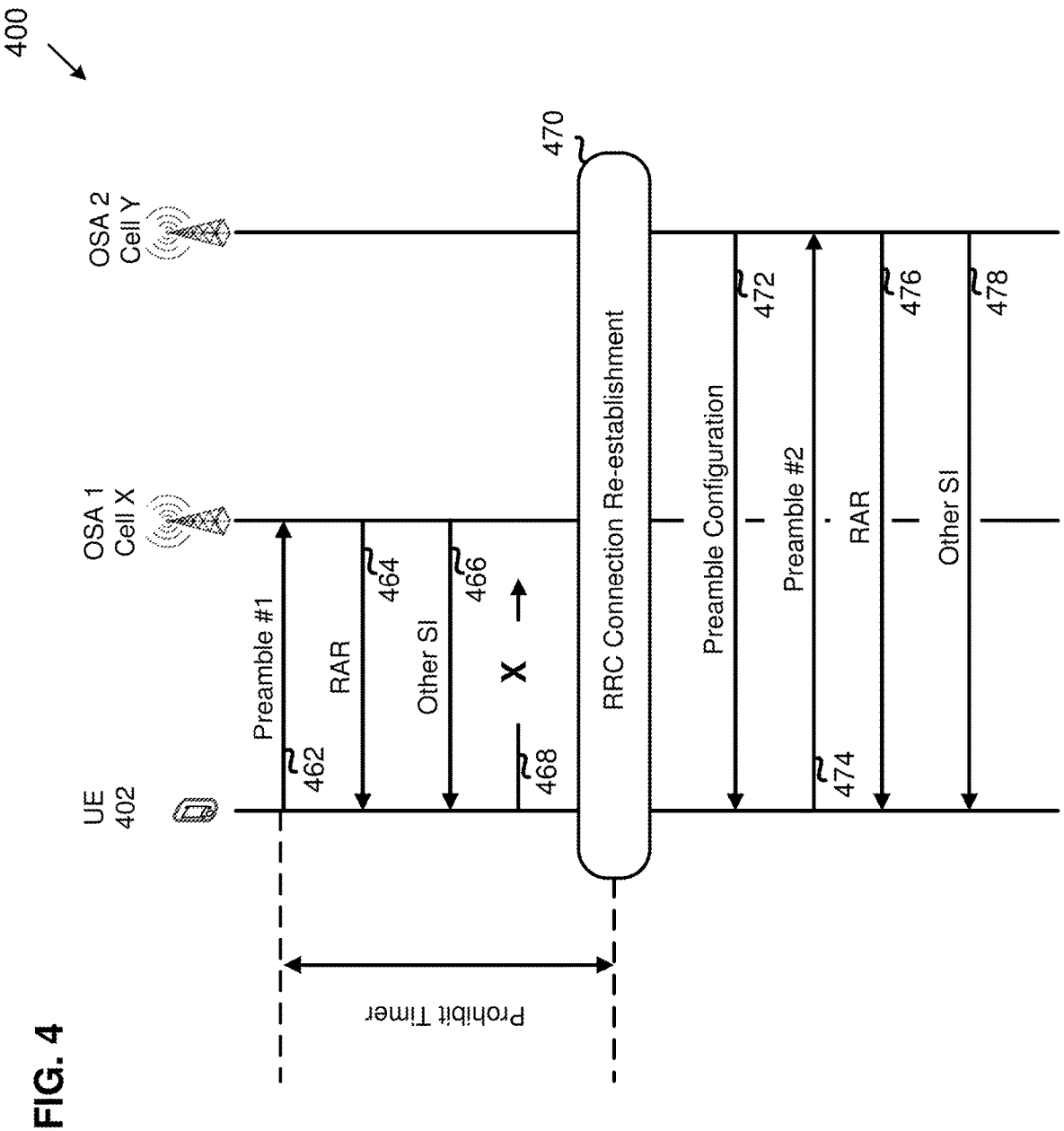
FIG. 4 is a diagram illustrating mechanisms for other SI acquisition through UE-oriented signaling, in accordance with implementations of the present application.

For other SI acquisition through UE-oriented signaling, a UE may send on-demand signaling to a cell to request for other SI. Thereafter, the cell may send or transmit the other SI to the UE. FIG. 4 is a diagram illustrating mechanisms for other SI acquisition through UE-oriented signaling, in accordance with implementations of the present application.

In FIG. 4, diagram 400 includes actions 462, 464, 466, 468, 470, 472, 474, 476, and 478. In diagram 400, actions 462, 464, 466, and optionally 468 describe an on-demand signaling mechanism in which a UE may transmit a specific preamble to request for other SI from a cell, according to an exemplary implementation of the present application. In diagram 400, actions 470, 472, 474, 476, and 478 describe an on-demand signaling mechanism in which a UE may transmit an RRC message to request for other SI from a cell, according to an exemplary implementation of the present application.

To facilitate other SI acquisition through UE-oriented on-demand signaling using specific preambles, a cell needs to identify a UE and its stored Value Tag of other SI. In one implementation, each UE is assigned with a specific preamble, for example, by the cell. In action 462, UE 402 may send its specific preamble (e.g. Preamble #1) to cell X in OSA1, when UE 402 needs to acquire other SI from cell X. When cell X receives the specific preamble from UE 402, cell X may recognize UE 402 based on the specific preamble assigned to UE 402. In action 464, cell X may send a random access response (RAR) to UE 402. Within the RAR, cell X may provide UE 402 with a scheduling opportunity (e.g., information regarding a downlink resource and etc.). It should be noted that non-contention based random access is applied in the present UE-oriented on-demand signaling mechanism. In action 466, cell X may send other SI to UE 402 using the scheduled opportunity. In another implementation, a common preamble may be assigned to all UEs for requesting their corresponding other SI. The cell may broadcast the other SI when receiving the common preamble.

It should be noted that a prohibit timer may be used to prevent UE 402 from sending another on-demand signaling to cell X to request for the same other SI within a predetermined time set by the prohibit timer. In one implementation, cell X may configure the prohibit timer to set the predetermined time for on-demand signaling. As shown in FIG. 4, in action 468, UE 402 attempts to send its specific preamble to cell X again to request for the other SI from cell X after sending the specific preamble in action 462. Because the prohibit timer has not expired, UE 402 is prohibited from sending the request to cell X as shown in action 468. It is noted that different prohibit timers may be used for different other SIs, and the start and expiration of each prohibit timer may be independent of each other.

It should be noted that, in one implementation, cell X may recognize the stored Value Tag of other SI of UE 402 based on the specific preamble from UE 402. When cell X receives the specific preamble from UE 402, cell X may reply its current other SI to UE 402 regardless the Value Tag of other SI stored on UE 402.

It should be noted that, in one implementation, when UE 402 moves out of OSA 1 into a new OSA (e.g., OSA 2), the specific preamble assigned to UE 402 may be re-assigned to anther UE in cell X, for example. The assignment of the specific preamble is performed through the minimum SI.

To facilitate other SI acquisition through UE-oriented on-demand signaling using RRC messages, a UE may need to perform random access procedures to establish or re-establish an RRC connection with a cell. Once the UE establishes an RRC connection with the cell, the UE may use a specific RRC message to request for other SI from the cell.

In one implementation, the UE may only receive updated other SI parameters and/or values from the cell. In such case, the UE needs to send its stored Value Tag of other SI to the cell, the cell may determine what values and/or parameters have been updated by comparing the other SI corresponding to the stored Value Tag from the UE with the cell's current (most updated) other SI. In such case, the UE may need to enter the network, before sending its stored Value Tag to the cell.

With reference to FIG. 4, in action 470, UE 402 (re-)establishes an RRC connection with cell Y in OSA2, for example, and sends an RRC message to cell Y when it is connected to cell Y. In action 472, cell Y sends a preamble configuration to UE 402. Thereafter, UE 402 sends a preamble (e.g., preamble #2) to cell Y in action 474. In action 476, cell Y sends an RAR to UE 402, where the RAR contains a scheduling opportunity (e.g., information on a DL resource and etc.) for other SI. In action 478, cell Y sends the other SI to UE 402 using the scheduled opportunity. In another implementation, a cell may broadcast the other SI after receiving the specific RRC message from the UE.

It should be noted that a prohibit timer (not explicitly shown in FIG. 4) may be used to prevent UE 402 from sending another on-demand signaling to cell Y to request for the other SI within a predetermined time set by the prohibit timer. In one implementation, cell Y may configure the prohibit timer to set the predetermined time for on-demand signaling. The prohibit timer is triggered, when UE 402 sends the RRC message for on-demand signaling in action 470. The prohibit timer prohibits the UE from sending another on-demand signaling until the prohibit timer expires. It is noted that different prohibit timers may be used for different other SIs, and the start and expiration of each prohibit timer may be independent of each other.

It should be noted that, in one implementation, cell Y may recognize the stored Value Tag of other SI of UE 402 based on the RRC message from UE 402. When cell Y receives the RRC message from UE 402, cell Y may reply its current other SI to UE 402 regardless the Value Tag of other SI stored in UE 402.

For other SI acquisition through cell-oriented signaling, a cell may provide other SI without receiving on-demand signaling from a UE. For other SI acquisition through cell-oriented signaling, in one implementation, a cell may transmit the new other SI to all of its connected UEs when the version of other SI changes. The cell may either transmit the entire new other SI to all of its connected UEs, or transmit only delta information (e.g., updated other SI parameters and/or values) to the connected UEs. The cell may use a specific group radio network temporary identifier (RNTI), and schedule an other SI transmission for a group of UEs. The group RNTI may be configurable as the cell may provide identification when the UEs perform RRC connection establishment.

For other SI acquisition through cell-oriented signaling, in another implementation, a cell may apply cell-oriented signaling, when a UE establishes or re-establishes an RRC connection with the cell. The cell may initiate signaling other SI by using an RRC configuration message.

For other SI acquisition through cell-oriented signaling, in another implementation, a cell may apply cell-oriented signaling, when the cell receives information regarding changes in UE capability. Examples of changes in UE capability may include change in preferred network slicing, change in preferred radio access technology (RAT), and etc. In some implementations, different network slicings may apply different contents of other SI. For example, cells in the same OSA may have common other SI for each respective network slicing.

Figure 5:
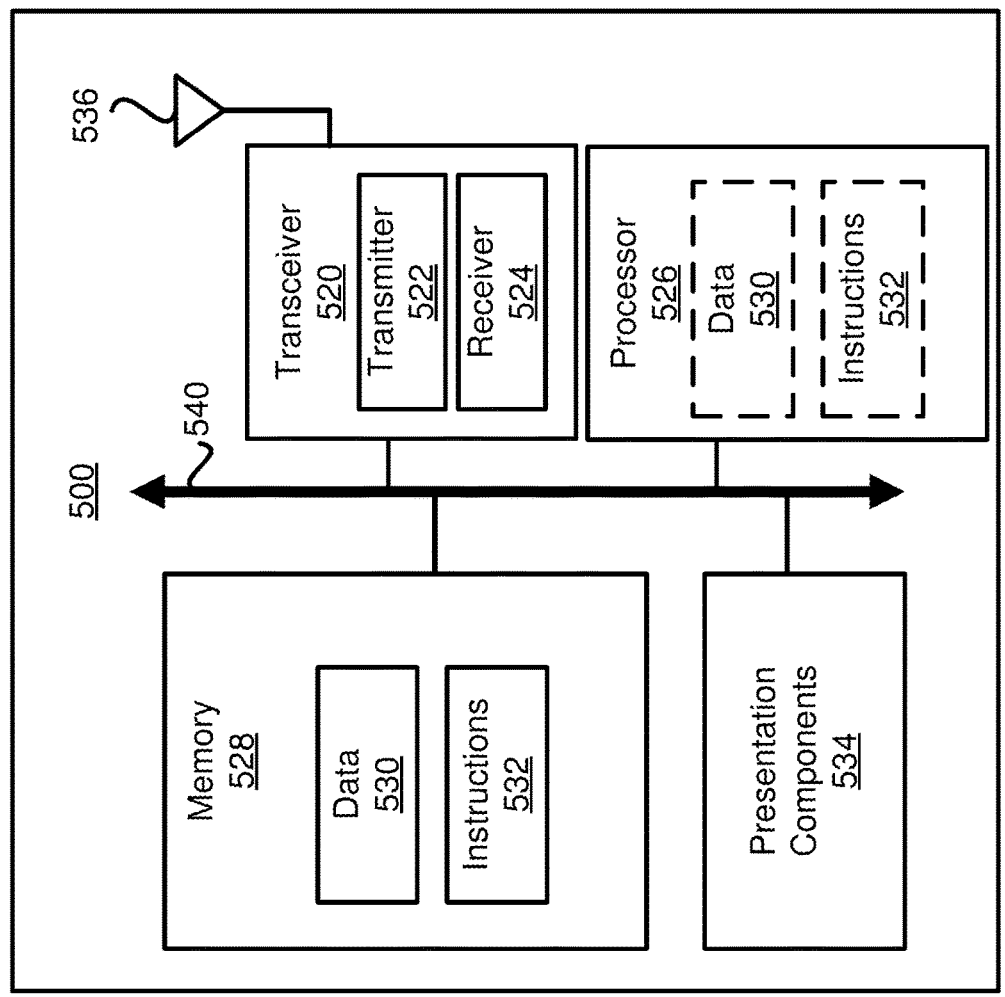
FIG. 5 illustrates a block diagram of a node for wireless communication, in accordance with various aspects of the present application.

FIG. 5 illustrates a block diagram of node 500 for wireless communication, in accordance with various aspects of the present application. The node 500 may have various configurations and may be included or be part of a base station and/or a UE. In some implementations, node 500 may be an example of one or more aspects of base stations 104*a*, 104*b*, 104*c*, 104*d*, and/or 104*e* described with reference to FIG. 1. In some implementations, node 500 may be an example of one or more aspects of UEs 102*a*, 102*b*, and/or 102*c* in FIG. 1, and UE 402 in FIG. 4. Node 500 may be configured to implement or facilitate at least some of the features and functions described with reference to FIGS. 1, 2A, 2B, 3, and 4.

As shown in FIG. 5, node 500 may include transceiver 520, processor 526, memory 528, one or more presentation components 534, and at least one antenna 536. Node 500 may also include an RF spectrum band module, a base station communications module, a network communications module, and a system communications management module, input/output (I/O) ports, I/O components, and power supply (not explicitly shown in FIG. 5). Each of these components may be in communication with each other, directly or indirectly, over one or more buses 540.

Transceiver 520 having transmitter 522 and receiver 524 may be configured to transmit and/or receive time and/or frequency resource partitioning information. In some implementations, transceiver 520 may be configured to transmit in different types of subframes and slots including, but not limited to, usable, non-usable and flexibly usable subframes and slot formats. Transceiver 520 may be configured to receive data and control channels.

Node 500 may include a variety of computer-readable media. Computer-readable media can be any available media that can be accessed by node 500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 528 may include computer-storage media in the form of volatile and/or non-volatile memory. Memory 528 may be removable, non-removable, or a combination thereof. Exemplary memory includes solid-state memory, hard drives, optical-disc drives, and etc. As illustrated in FIG. 5, memory 528 may store computer-readable, computer-executable instructions 532 (e.g., software codes) that are configured to, when executed, cause processor 526 to perform various functions described herein, for example, with reference to FIGS. 1, 2A, 2B, 3, and 4. Alternatively, instructions 532 may not be directly executable by processor 526 but be configured to cause node 500 (e.g., when compiled and executed) to perform various functions described herein.

Processor 526 may include an intelligent hardware device, a central processing unit (CPU), a microcontroller, an ASIC, and etc. Processor 526 may include memory. Processor 526 may process data 530 and instructions 532 received from memory 528, and information through transceiver 520, the base band communications module, and/or the network communications module. Processor 526 may also process information to be sent to transceiver 520 for transmission through antenna 536, to the network communications module for transmission to a core network.

One or more presentation components 534 presents data indications to a person or other device. Exemplary one or more presentation components 534 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in foi in and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A method for system information (SI) acquisition by a user equipment (UE) in a radio resource control (RRC) Connected state, the SI comprising minimum SI and at least one other SI block, the method comprising:
receiving the minimum SI from a base station, the minimum SI having an area identification (ID) and at least one value tag;
comparing the area ID with an area ID stored at the UE;
comparing the at least one value tag with a value tag stored at the UE;
transmitting an RRC message to the base station to acquire the at least one other SI block from the base station when the area ID is the same as the stored area ID, and the value tag is different from the stored value tag; and
starting a prohibit timer configured by the base station after sending a system information request;
wherein the UE is not allowed to perform system information acquisition until the prohibit timer expires.

2. The method of claim 1, wherein the area ID is assigned to at least two cells in the wireless communication network.

3. The method of claim 2, wherein the at least two cells share the at least one other SI block having the same content, and the UE does not need to acquire the at least one other SI block when moving into one of the at least two cells from another one of the at least two cells when the at least two cells are assigned with the same area ID.

4. The method of claim 2, wherein each cell of the at least two cells broadcasts a minimum SI of the cell having a different content from the other cell.

5. The method of claim 1 further comprising acquiring at least one updated parameter of the at least one other SI block from the base station when the value tag in the minimum SI is different from the stored value tag on the UE.

6. The method of claim 5 further comprising receiving the updated parameter of the at least one other SI block from the base station when the area ID is the same as the stored area ID, and the value tag is different from the stored value tag on the UE.

7. The method of claim 1, wherein the minimum SI includes an information field, the information field includes at least one of the area ID and the value tag.

8. The method of claim 7, wherein the information field only includes the area ID, and the value tag is provided to the UE in the at least one other SI block.

9. The method of claim 1, wherein the value tag includes a version of the at least one other SI block.

10. The method of claim 1 further comprising, when the area ID is different from the stored area ID or the value tag is different from the stored value tag, transmitting a specific preamble to the base station to acquire the at least one other SI block.

11. The method of claim 10 further comprising acquiring the at least one other SI block from the base station in a dedicated resource when the base station receives the specific preamble.

12. The method of claim 1, wherein a first minimum SI associated with a first cell within a particular area includes different content than a second minimum SI associated with a second cell within the particular area, while a first other SI block associated with the first cell includes a same content as a second other SI block associated with the second cell.

13. The method of claim 1, further comprising acquiring the at least one other SI block after transmitting the RRC message to the base station requesting the at least one other SI block.

14. A user equipment (UE) for wireless communication in a wireless communication network, the UE comprising:
one or more non-transitory computer-readable media having computer-executable instructions embodied thereon;
at least one processor coupled to the one or more non-transitory computer-readable media, and configured to execute the computer-executable instructions to:
receive, while the UE is in a radio resource control (RRC) Connected state, minimum system information (SI) from a base station, the minimum SI having an area identification (ID) and at least one value tag;
compare the area ID with an area ID stored at the UE;
compare the at least one value tag with a value tag stored at the UE;
transmit, while the UE is in the RRC Connected state, an RRC message to the base station to acquire at least one other SI block from the base station when the area ID is the same as the stored area ID, and the value tag is different from the stored value tag;
start, while the UE is in the RRC Connected state, a prohibit timer configured by the base station after sending a system information request;
wherein the UE is not allowed to perform system information acquisition until the prohibit timer expires.

15. The UE of claim 14, wherein the area ID is assigned to at least two cells in the wireless communication network.

16. The UE of claim 15, wherein the at least two cells share the at least one other SI block having the same content, and the UE does not need to acquire the at least one other SI block when moving into one of the at least two cells from another one of the at least two cells, when the at least two cells are assigned with the same area ID.

17. The UE of claim 15, wherein each cell of the at least two cells broadcasts a minimum SI of the cell having a different content from the other cell.

18. The UE of claim 14, wherein the at least one processor is coupled to the one or more non-transitory computer-readable media, and configured to execute the computer-executable instructions to:
acquire at least one updated parameter of the at least one other SI block from the base station when the value tag in the minimum SI is different from the stored value tag on the UE.

19. The UE of claim 18, wherein the at least one processor is coupled to the one or more non-transitory computer-readable media, and configured to execute the computer-executable instructions to:
acquire the updated parameter of the at least one other SI block from the base station when the area ID is the same as the stored area ID, and the value tag is different from the stored value tag on the UE.

20. The UE of claim 14, wherein when the UE identifies that the area ID is different from the stored area ID or the value tag is different from the stored value tag, the UE is configured to transmit a specific preamble to the base station to acquire the at least one other SI block.

21. The UE of claim 20, wherein the at least one processor is further configured to execute the computer-executable instructions to:

acquire the at least one other SI block from the base station in a dedicated resource when the base station receives the specific preamble.

22. The UE of claim 14, wherein a first minimum SI associated with a first cell within a particular area includes different content than a second minimum SI associated with a second cell within the particular area, while a first other SI block associated with the first cell includes a same content as a second other SI block associated with the second cell.

23. The UE of claim 14, wherein the at least one processor is coupled to the one or more non-transitory computer-readable media, and configured to execute the computer-executable instructions to acquire the at least one other SI block after transmitting the RRC message to the base station requesting the at least one other SI block.

\* \* \* \* \*